United States Patent [19]

Widener et al.

[11] Patent Number: 4,640,407

[45] Date of Patent: Feb. 3, 1987

[54] END PLUG ORIENTATION DEVICE

[75] Inventors: Wade H. Widener, Cayce; Kenneth K. Klapper, West Columbia, both of S.C.

[73] Assignee: Westinghouse Electric Corp., Pittsburgh, Pa.

[21] Appl. No.: 563,898

[22] Filed: Dec. 21, 1983

[51] Int. Cl.$^4$ .............................................. B65G 47/22
[52] U.S. Cl. ..................................... 198/389; 198/406
[58] Field of Search ............... 198/392, 391, 389, 400, 198/406; 193/44; 221/171, 172

[56] References Cited

U.S. PATENT DOCUMENTS

| | | | |
|---|---|---|---|
| 2,904,162 | 10/1959 | Simer | 198/391 |
| 3,502,193 | 3/1970 | Greshaw | 198/389 |
| 3,584,727 | 6/1971 | Froehlking | 198/400 |
| 3,656,605 | 4/1972 | Gess | 198/391 |
| 3,687,263 | 8/1972 | Randrup | 198/400 |
| 4,182,030 | 1/1980 | Mullins | 198/389 |
| 4,236,302 | 12/1980 | Kuehling | 198/391 |
| 4,440,286 | 4/1984 | Saxon | 198/389 |

FOREIGN PATENT DOCUMENTS

| | | | |
|---|---|---|---|
| 55-52814 | 4/1980 | Japan | 198/391 |
| 57-151522 | 9/1982 | Japan | 198/391 |
| 57-189912 | 11/1982 | Japan | 198/391 |
| 614930 | 6/1978 | U.S.S.R. | 221/171 |
| 823074 | 4/1981 | U.S.S.R. | 221/172 |

Primary Examiner—Joseph E. Valenza
Assistant Examiner—Kyle E. Shane

[57] ABSTRACT

An orientation device for properly orienting nuclear fuel rod end plugs (18) in their proper mode for ultimate use and processing includes a funnel (12) the inside diameter (d) of which is greater than the diameter (D) of each end plug (18), and the diameter (D) of each plug (18) is greater than the length (L) of each plug. The plugs (18) are permitted to pass through the funnel bore (30), however, only when the longitudinal axis of each plug is coaxial with the longitudinal axis of the funnel bore (30) because the diagonal dimension (DG) of each plug as defined between any point on the plug's upper peripheral surface (26) and a point disposed diametrically opposite the first point upon the lower peripheral surface (28) is greater than the diameter (d) of the funnel bore. Each plug (18) also includes a large diameter portion (20) having the diametrical dimension D, and a smaller diameter portion (22), and in order to insure the ultimate proper orientation of each plug such that the smaller diameter portion (22) is disposed downwardly, the plugs (18) are pivoted 90° by a deflector plate (38) and are transferred to a second re-orientation zone which includes a semicircular trough (36) and a rectangularly configured trough (42) having rails (44) defined within the sidewalls for supporting the plugs (18") in their correctly oriented vertical mode. The plugs (18") are discharged through a port (58) to a shuttle mechanism for subsequent processing.

15 Claims, 4 Drawing Figures

END PLUG ORIENTATION DEVICE

BACKGROUND OF THE INVENTION

1. Field of the Invention:

The present invention relates generally to nuclear reactor fuel rod fabrication or assembly apparatus, and more particularly to apparatus, interposed between a vibratory feed bowl type conveyor and a nuclear reactor fuel rod end plug shuttle mechanism, which is capable of properly orienting the nuclear reactor fuel rod end plugs, as the same are randomly delivered by means of the vibratory feed bowl apparatus, so as to eliminate excessive cycling of the end plugs within the vibratory feed bowl apparatus which has conventionally been necessitated in an effort to prevent any jamming or backing-up of the end plugs within the shuttle mechanism or the feed bowl due to the improper orientation of the end plug components, whereby the continuous delivery of the nuclear reactor fuel rod end plugs in a predetermined periodic manner, and in their proper orientation mode, to the shuttle mechanism is facilitated such that the latter can, in turn, convey the end plugs in the particular orientation mode required by the apparatus for assembling together the nuclear reactor fuel rod cladding casings and the nuclear reactor fuel rod end plug components for fabrication of the completed nuclear reactor fuel rods.

2. Description of the Prior Art:

As is well known in the nuclear power plant art, the nuclear reactor core of a typical facility or plant may comprise, for example, at least one hundred or more fuel assemblies, and each fuel assembly, in turn, may comprise, for example, approximately several hundred fuel rods. As an example, a conventional fuel assembly may comprise what is known as a 17×17 array of fuel rods, which means that there are seventeen rows or columns of fuel rods, and each row or column contains seventeen fuel rods. Consequently, each fuel assembly would comprise two-hundred eighty-nine fuel rods. In turn, if the reactor core comprised at least one hundred fuel assemblies, it can be readily appreciated that the core would comprise approximately thirty-thousand fuel rods.

The nuclear reactor core fuel pins or fuel rods conventionally comprise thin-walled tubing or cladding within which the fissionable material is housed and supported in a totally encased manner during operation of the reactor. The cladding serves to prevent contact and chemical reactions from occurring between the nuclear fuel and the surrounding environment, such as, for example, the coolant water in a pressurized water reactor (PWR), and of course the cladding additionally serves to confine the radioactive fissionable material therewithin. In order to achieve the aforenoted operational objectives, the cladding must therefore be corrosion resistant, non-reactive, and heat conductive. Conventionally employed materials utilized in the fabrication of the fuel rod cladding include, for example, type 304 stainless steel, or zirconium based alloys, such as, for example, zircaloy-2 or zircaloy-4. The zirconium based alloys are in fact preferable over the stainless steel materials in view of the fact that the zirconium alloys exhibit relatively low capture cross-sections with respect to thermal neutrons.

In accordance with actual conventional fuel pin or fuel rod fabrication techniques, the nuclear fuel, which is usually in the form of cylindrical pellets of uranium dioxide ($UO_2$) enriched with U-235, is hermetically sealed within the fuel rod cladding or tubing by inserting the fuel within the cladding or tubing and subsequently capping both ends of the cladding or tubing with end plugs or closures which are temporarily attached to the tubing or cladding by means of a force fit. The end plugs are then permanently sealed in position within the tubing or cladding by means of welding operations which are performed, for example, by rotating the tubing relative to an electrode which thereby forms a girth weld at the cladding-plug interfaces, the resulting assemblage of the cladding and end plugs thereby defining the completed fuel rods or pins.

In view of the aforenoted large number of fuel rods which comprise a typical nuclear reactor facility core, and in view of the additional fact that each fuel rod requires two end plugs or closures for its fabrication, it may readily be surmised that the fuel rods are fabricated or assembled in accordance with mass-production techniques which encompass the employment of automatic machinery, peripheral equipment, and assembly apparatus. In particular, in the fabrication of assembled cladding-end plugs fuel rods, the end plugs are conventionally initially deposited en masse within a vibratory bowl type feeder or conveyor wherein, in a conventional manner, the end plugs would be vibrationally conveyed upon a spiral track defined about the periphery of the conveyor until the plugs reached the uppermost track portion at the end of which they would be discharged into, for example, the shuttle mechanism which will operationally interface with the apparatus for inserting the end plugs within the ends of the cladding tubes in preparation for the welding operations. As would often happen, however, the end plugs would be randomly oriented upon the spiral track of the vibratory feed conveyor such that, for example, the longitudinal axes of some of the end plug components would be disposed vertically while the longitudinal axes of some of the other end plug components would be disposed horizontally. The desired orientation mode for the end plug components is the former with their longitudinal axes disposed vertically. In addition, the end plug components have, for example, an upper portion and a lower portion of different diametrical extents whereby an annular shoulder or flange portion is defined at the interface of the two diametrically different portions. This shoulder or flange portion is ultimately disposed in butt contact with the end wall or surface of the fuel rod cladding casing or tube. Consequently, the particularly desired end plugs, from a proper orientation viewpoint, are those with their longitudinal axes disposed vertically, and with the small diameter portions thereof disposed downwardly. This is necessitated in order that the plug components are able to be properly disposed within the shuttle mechanism for, in turn, conveying or transferring the plug components to the apparatus for inserting the end plugs within the cladding tubes or casings. It may therefore be readily appreciated that those plug components which are oriented in modes other than this particularly required mode must be recycled back into the vibratory feed bowl apparatus, or else jamming will occur within the shuttle mechanism should improperly oriented plug components be attempted to be inserted within the shuttle mechanism. Such jamming will of course then lead to backing-up of the plug components within the feed bowl which may necessitate shutting down of the vibratory feed conveyor apparatus. Consequently, conventional vibratory feed bowl apparatus employed in connection with such conveying techniques of the plug components have been provided with plunger or finger type mechanisms which can be activated to deflect improperly oriented plug components back into the vibratory feed bowl for recycling. These conveying techniques, however, have proven to be unacceptable from production goal standpoints in view of the inordinate or excessive amount of cycling time required to achieve a throughput of a predetermined number of plug components for ultimately operationally interfacing with the apparatus for inserting the end plugs within the fuel rod cladding casings.

Accordingly, it is an object of the present invention to provide new and improved nuclear reactor fuel rod fabrication or assembly apparatus.

Another object of the present invention is to provide new and improved nuclear reactor fuel rod fabrication or assembly apparatus which overcomes the various aforenoted disadvantages of conventional nuclear reactor fuel rod fabrication or assembly apparatus.

Still another object of the present invention is to provide new and improved nuclear reactor fuel rod fabrication or assembly apparatus which will substantially enhance the production rate of assembled nuclear reactor fuel rods.

Yet another object of the present invention is to provide new and improved nuclear reactor fuel rod fabrication or assembly apparatus which will substantially increase the throughput volume rate of nuclear reactor fuel rod end plugs from vibratory conveyor apparatus to the associated shuttle mechanism.

Still yet another object of the present invention is to provide new and improved nuclear reactor fuel rod fabrication or assembly apparatus wherein the nuclear reactor fuel rod end plugs are automatically properly oriented for deposition within the shuttle mechanism operationally interfacing with the fabrication or assembly apparatus which inserts the end plugs within the fuel rod cladding casings.

Yet still another object of the present invention is to provide new and improved nuclear reactor fuel rod fabrication or assembly apparatus wherein the cycling time for the fuel rod end plugs within the vibratory feed conveyor is drastically reduced.

A further object of the present invention is to provide new and improved nuclear reactor fuel rod fabrication or assembly apparatus wherein the nuclear reactor fuel rod end plugs are automatically properly oriented despite the conveyance of the end plugs to the apparatus of the present invention by means of the vibratory conveyor in a purely random manner.

A still further object of the present invention is to provide new and improved nuclear reactor fuel rod fabrication or assembly apparatus wherein substantially one-hundred percent of the cycled fuel rod end plugs will be properly oriented so as to continuously deliver the end plugs in a predetermined periodic manner to the shuttle mechanism of the fabrication apparatus.

A yet further object of the present invention is to provide new and improved nuclear reactor fuel rod fabrication or assembly apparatus which is particularly adapted for handling fuel rod end plugs which are characterized by a diametrical dimension which is greater than the length dimension.

A still yet further object of the present invention is to provide new and improved nuclear reactor fuel rod fabrication or assembly apparatus which will permit passage of the fuel rod end plugs through the apparatus in only one major mode whereby the end plugs will automatically be properly oriented.

SUMMARY OF THE INVENTION

The foregoing and other objectives are achieved in accordance with the present invention through the provision of nuclear reactor fuel rod fabrication or assembly apparatus which includes an orientation device which is adapted to be interposed between a vibratory feed bowl type conveyor which is discharging fuel rod end plugs in a random fashion, and a shuttle mechanism which will in turn convey the fuel rod end plugs to appropriate apparatus for inserting the same within the fuel rod cladding casings. The orientation device serves to properly orient the fuel rod end plugs being discharged by means of the vibratory feed bowl conveyor in an entirely random manner such that excessive recycling of the plugs within the vibratory feed bowl conveyor is obviated, and in addition, the device also serves to further orient the end plugs in a particularly required mode whereby the plugs may in fact be deposited within the shuttle mechanism in the particular mode which will ultimately be required by means of the apparatus for inserting the end plugs within the fuel rod cladding casings, and with which such apparatus the shuttle mechanism operationally interfaces. The orientation process performed by means of the orientation device of the present invention is therefore seen to comprise two separate and distinct orientational movements of the end plugs within the orientation device of the present invention.

In particular, the orientation device of the present invention includes an elongated base having an upstanding funnel fixedly mounted at one end thereof for receiving the fuel rod end plugs as they are discharged from the vibratory feed bowl conveyor. Each of the fuel rod end plugs has the configuration of a right circular cylinder wherein the diametrical extent of the plug is greater than the axial length thereof. One of the unique features of the present invention orientation device has in fact been the means for properly orienting the plugs in view of the aforenoted differences in the characteristic dimensions thereof. It is particularly desired, as dictated by the requirements of the plug processing, that the plugs be oriented and conveyed through the funnel such that the longitudinal axis of each plug is substantially coincident with the longitudinal axis of the funnel, and that this is the only mode in which the plugs may in fact be oriented and passed through the orientation device funnel for further processing and orientation at operative stations downstream of the funnel. Consequently, in accordance with the present invention, the diametrical extent of the funnel is made to be just slightly larger than that of each plug, and while the length of each plug is less than its corresponding diameter, and therefore less than the diameter of the funnel bore, the plugs cannot pass through the funnel bore when the longitudinal axis of any plug is disposed substantially perpendicular to the longitudinal axis of the funnel bore because the lineal dimension across the plug, as taken or viewed in either of the two diagonal planes when the plug is in fact viewed from its side, is greater than the diametrical extent of the funnel bore. Describing these relative lengths and dimensions in another manner, if a vertical cross-section was taken along any of the diametrical planes of the plug so as to include the longitudinal axis of the plug, and if a right triangle were formed by the upstanding sidewall portion of the plug within the cross-section plane, the bottom end wall of the plug within the cross-section plane, and a line within the cross-section plane drawn between the free ends of the aforenoted two sides of the triangle so as to define the diagonally extending hypotenuse of the triangle, the aforenoted two sides of the triangle, that is, the side of the triangle and the base thereof, would both have lineal dimensions which were less than the diametrical extent of the funnel bore, however, the hypotenuse of such triangle would have a lineal dimension greater than that of the diameter of the funnel bore. In view of the foregoing, and further in view of the fact that each end of each plug is provided with a peripheral chamfer, when the plugs are discharged from the vibratory feed bowl conveyor into the orientation device, all of the plugs will be longitudinally aligned with the longitudinally extending bore of the orientation funnel under the influence of the vibrations transmitted to the orientation device from the vibratory feed bowl conveyor to which the orientation device is of course securely mounted.

In view of the fact that in accordance with the foregoing, the plugs, while oriented vertically, can nevertheless be disposed, in effect, in an inverted mode, further means are provided for orienting the plugs in their proper vertical mode. The elongated base of the orientation device is provided at the opposite end thereof with a discharge port through which the finally properly oriented plugs are discharged to the shuttle mechanism which will, in turn, operationally interface with the plug insertion equipment of the fuel rod fabrication or assembly apparatus. In order to conduct the plugs to the discharge port, a deflector is disposed upon the base at a position directly beneath the lower discharge end of the orientation funnel bore. The plugs are thus forced to enter a semi-circular trough within which they move while disposed upon a sidewall portion thereof. The trough, in turn, discharges into a stepped-down rectangularly configured conveyor section having support rails disposed along the sides thereof. Each of the plugs is characterized by an upper enlarged diametrical portion and a lower portion having a diameter less than that of the upper portion. An annular flange or shoulder is thus defined between the two plug portions which is ultimately disposed in butt contact with the end of the fuel rod cladding casing or tubing. The width of the orientation device conveyor section is such that diametrically opposed portions of the plug flange or shoulder can be seated upon the conveyor rails so as to facilitate conveyance of the plugs along the rails toward the discharge port. This disposition of the plugs upon the conveyor rails represents the only stable mode of the plugs relative to their supported position upon the rails, and consequently, under the influence of the vibrations transmitted to the orientation device from the vibratory feed bowl conveyor, the plugs will always attain this proper vertical disposition or mode so as to be properly discharged from the orientation device discharge port.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENT

Figure 1:
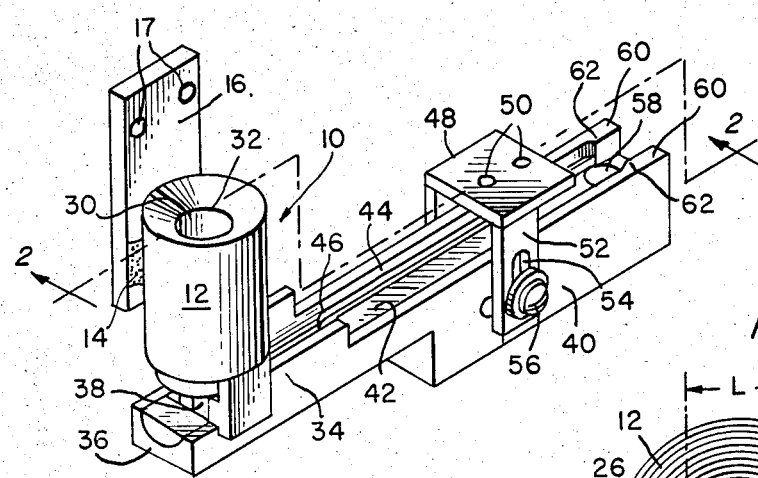
FIG. 1 is a perspective view of the new and improved nuclear reactor fuel rod end plug orientation device constructed in accordance with the present invention and showing the cooperative parts thereof.
Figure 2:
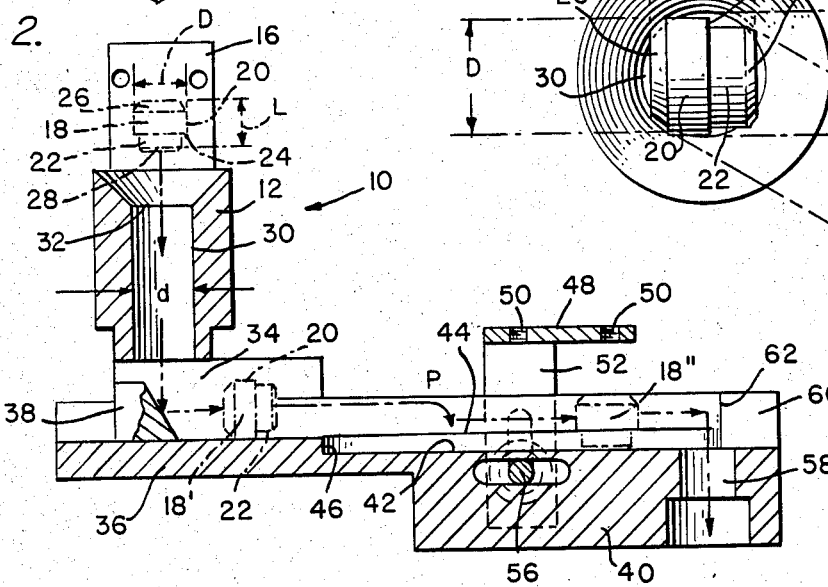
FIG. 2 is a longitudinal cross-sectional view of the orientation device of FIG. 1 as taken along the line 2—2 of FIG. 1.
Figure 3:
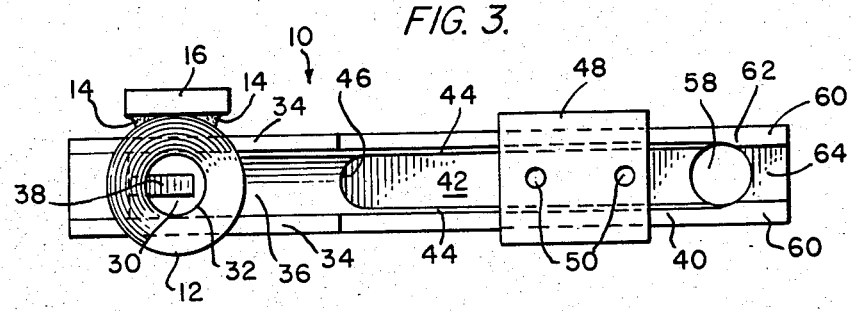
FIG. 3 is a plan view of the orientation device of FIG. 1.

Referring now to the drawings, and more particularly to FIGS. 1–3 thereof, there is shown the new and improved nuclear reactor fuel rod end plug orientation device constructed in accordance with the present invention and generally indicated by the reference character 10. The orientation device 10 is seen to include a vertically disposed funnel 12 which is welded, as shown at 14, to a vertically extending bracket plate 16 having the configuration of a rectangular parallelepiped. The bracket plate 16 is seen to include a pair of threaded bores 17 by means of which the device may be secured, by suitable fasteners, not shown, to the vibratory feed bowl conveyor, also not shown. It is to be appreciated that the vibratory feed bowl conveyor will discharge, for example, the nuclear reactor fuel rod end plugs 18 into the orientation device funnel 12 as schematically shown in FIG. 2.

Figure 4:
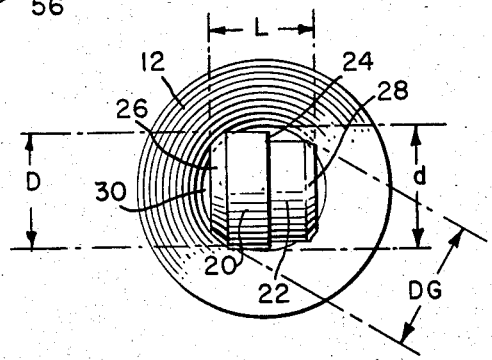
FIG. 4 is a plan view of the orientation device funnel within which is disposed a nuclear reactor fuel rod end plug as disposed upon its side and therefore being prevented from passing through the orientation funnel due to the particular lineal dimensions of the plug relative to the diametrical extent of the funnel bore.

As may best be appreciated from FIGS. 2 and 4, each of the nuclear reactor fuel rod end plugs 18 has the configuration of a right circular cylinder, and it is additionally seen that the upper half-portion 20 has a diametrical extent D which is greater than the diametrical extent of the lower half-portion 22. In this manner, a circumferentially extending annular flange or shoulder 24 is defined between the upper and lower half portions 20 and 22 of each plug 18. The upper edge portion of each plug 18 is also seen to be chamfered as at 26, while the lower peripheral edge portion of each plug 18 is seen to be similarly chamfered as at 28. The diameter D of the upper half portion 20 of each plug 18 is greater than the length L of each plug, and if an orientation device were going to be developed in order to properly orient fuel rod end plugs 18 as they are randomly delivered or discharged from the vibratory feed bowl conveyor, such diametrical and length dimensional parameters had to be appropriately accommodated. In particular, regardless of the disposition or orientation mode in which any particular fuel rod end plug may be delivered or discharged from the vibratory feed bowl conveyor apparatus, such plugs had to be oriented to a predetermined mode which is required for their subsequent use, and such orientation of the end plugs would have to be capable of being achieved in connection with each plug such that initially improperly oriented plugs need not be unnecessarily excessively recycled within the vibratory feed bowl conveyor apparatus.

Accordingly, the orientation device funnel 12 is provided with a vertically extending bore 30 which has a diametrical extent or dimension d which is slightly greater than the diameter D of the large-diameter upper portion 20 of each fuel rod end plug 18. Correspondingly, the diameter d of funnel bore 30 is therefore, by definition, larger than the length L of each plug 18, and therefore, it might initially appear that the plugs 18 would be able to pass through the bore 30 of funnel 12 regardless of their orientation or disposition relative to the funnel bore 30. However, this, in fact, is seen not to be the case as may best be appreciated from FIG. 4. As is apparent from FIG. 4, while the diameter D of the large-diameter upper portion 20 of each end plug 18 as well as the length L of each plug 18 is less than the diameter d of the funnel bore 30, the lineal dimension DG as taken along either one of two diagonals, only one being illustrated for exemplary and clarity purposes, extending from any point upon the chamfered peripheral surface 26 of end plug 18 to a point diametrically opposite and disposed upon the chamfered peripheral surface 28, is greater than the diameter d of the funnel bore 30. Consequently, whenever any of the end plugs 18 is disposed upon a sidewall portion thereof so as to be seated within the throat 32 of the funnel 12, as illustrated in FIG. 4, such plugs 18 cannot in fact pass through the funnel throat 32 and bore 30 until the plugs 18 have re-oriented themselves such that the longitudinal axis of each plug 18 is coincident or substantially coaxial with the longitudinal axis of the funnel bore 30. This re-orientation procedure of the plugs 18 is automatically achieved under the influence of the vibratory forces impressed upon the plugs 18 as a result of their disposition within the throat area 32 of the funnel 12 to which vibrational forces are transmitted from the vibratory feed bowl conveyor apparatus, not shown, to which the entire orientation device 10 is fixedly secured. It is additionally noted that the provision of the upper and lower peripherally chamfered regions 26 and 28 of each end plug 18 facilitates the rolling or pivotal motion or movement which each improperly oriented plug 18 must undergo, relative to the funnel throat region 32, when being re-oriented and properly aligned from its position illustrated in FIG. 4 to its properly aligned or oriented position as illustrated in FIG. 1. It is lastly to be noted, of course, that any end plug 18 which is properly oriented relative to funnel 12, as the plug 18 is originally discharged or delivered from the vibratory feed bowl conveyor, need not of course undergo any realignment or re-orientation.

Continuing further with the orientation of the fuel rod end plugs 18 and their conveyance to the shuttle mechanism, not shown, which will ultimately operationally interface with the apparatus which inserts the end plugs within the fuel rod cladding casings, it is further apparent from the foregoing that while the orientation device funnel 12 will serve to orient the end plugs 18 in their vertical mode with their longitudinal axes disposed coaxially with the longitudinal axis of the funnel 12, the plugs 18 could be disposed either as illustrated in FIG. 2, which is the proper mode in which the large diameter portion 20 is disposed vertically above the small diameter portion 22, or in an inverted mode wherein the small diameter portion 22 of the plug 18 is disposed vertically above the large diameter portion 20 of the plug. Consequently, means must be provided for insuring that when the plugs 18 are transported to the shuttle mechanism, they will in fact be disposed in their proper mode as illustrated in FIG. 2.

Accordingly, it is seen that the funnel 12 is fixedly secured atop a pair of transversely spaced, upstanding brackets 34 which are fabricated so as to be integrally formed atop one end of a semi-circular trough 36. The inside diameter of trough 36 is substantially the same as that d of the funnel bore 30, or in other words, the diameter of trough 36 is just slightly larger than that D of each end plug 18 so that each end plug 18 can be conveyed along trough 36 on its side, or in a transverse mode, in a stable manner as illustrated at 18' in FIG. 2. In order to convert each end plug 18 from its vertical mode as illustrated at 18 in FIG. 2, to its side or transverse mode 18', a triangularly configured, vertically disposed deflector plate 38 is positioned along the longitudinal axial plane of the trough 36. The plate 38 is in the form of a right triangle with the base thereof fixedly secured to the bottom of trough 36 such that the lower end of the hypotenuse of the plate 38 is disposed directly beneath the lower discharge end of the funnel 12 as may best be appreciated from FIGS. 2 and 3. In this manner, as an end plug 18 traverses funnel bore 30, the plug 18 will engage the lower end of deflector plate 38 and be caused to be re-oriented through an angle of 90° to its transverse mode 18'. While the plug 18' is shown with the large diameter portion 20 thereof disposed toward the left of the small diameter portion 22 as viewed in the figure, it must be remembered that the plug 18' could be disposed in a reverse mode if the plug 18 was originally disposed in an inverted mode.

In order to insure that the plugs 18 are ultimately disposed in a vertical mode with the large diameter portion 20 thereof disposed above the small diameter portion 22, as illustrated at 18" in FIG. 2, trough 36 is fabricated so as to be integral with a base member 40 which has a rectangularly configured trough 42 defined therein. The sidewalls of trough 42 are provided with longitudinally extending rails 44, and the bottom of trough 42 is located at an elevational level which is below the bottom of trough 36 such that a vertical step 46 is defined between the trough sections 36 and 42. It is noted that the transverse or lateral distance defined between side rails 44 is just slightly larger than the outside diameter of the small diameter portion 22 of each plug 18 yet slightly less than the outside diameter D of the large diameter portion 20 of each plug 18. In this manner, as best appreciated from FIG. 2, when the plug 18' is conveyed through trough section 36 under the impelling influence of deflector plate 38, as well as the vibrational forces transmitted to the orientation device 10 by means of the vibratory feed bowl conveyor, the plug 18' will ultimately be disposed in its final proper vertically oriented mode 18" within which the annular flange or shoulder portion 24 of each plug 18 will have sidewall portions thereof ridingly disposed upon the side rails 44. The vertically recessed or stepped-down lower portion of trough 42 accommodates the small diameter portion 22 of each plug 18 as the plug 18" is supported upon the rails 44 by means of the shoulder portion 24, and regardless of the directional mode of the plug 18' as the same approaches the trough 42, that is, whether the plug 18' is as illustrated or reversed due to an initially inverted plug 18 within funnel 12, all plugs 18 will attain the final properly oriented mode 18" in view of the fact that this is the only stable mode which is possible to maintain under the conveying and vibrational forces. This is seen to be the case in view of the fact that when the plug 18' enters the trough 42, the plug 18' will tend to pivot downwardly as denoted by the arrow P such that the small diameter portion 22 of the plug 18' is in fact accommodated within the recessed trough. Should the plug 18' continue, however, upon its side, the curved sidewalls of the large diameter portion 20 of the plug 18' will be in contact with the rails 44, such interfacing serving to define a somewhat unstable relationship. Consequently, under the influence of the aforenoted vibrational forces, the plug 18' will in fact pivot in the direction of arrow P so as to attain its stable mode. Similarly, should the plug 18' somehow attain a temporary disposition wherein the plug 18' is inverted such that the chamfered portion 26 will now be disposed upon the rails 44, such an interface is an especially unstable mode whereby, again, the plug 18' will achieve its stable mode as illustrated at 18".

Additional bracket means in the form of a bail 48 is pivotably secured to the base member 40 so as to fixedly secure this end of the orientation device to the vibratory feed bowl conveyor, not shown, thereby eliminating a cantilevered mounting of the device as would normally be the case if such were attached to the vibratory conveyor solely by means of the bracket 16. Suitable threaded bores 50 are provided within bracket 48 for the reception of suitable fasteners, not shown, and the dependent legs 52 of bail bracket 48 are provided with vertically extending slots 54 which cooperate with suitable fasteners 56 by means of which elevational and pivotable adjustment of the bracket 48 is facilitated.

The downstream end of base member 40, as viewed in the direction of travel of the plugs 18 through the orientation device, is provided with a vertically extending discharge port 58 through which the properly oriented plugs 18 pass to the shuttle mechanism, not shown, which will operationally interface with the insert assembly apparatus for inserting the plugs 18 within the nuclear reactor fuel rod cladding casings. In order to prevent overtravel or overshoot of the plugs 18" with respect to discharge port 58, or in other words, in order to insure coaxial alignment of the plugs 18" with discharge port 58 so that the plugs 18" may simply drop down through the port 58, the sidewalls of the rectangular trough section 42 are provided with thickened wall portions 60 immediately downstream of discharge port 58, as well as inwardly projecting curvilinear portions 62 which have radii precisely matching that of the discharge port 58 and coaxially alinged therewith. The plugs 18" therefore encounter such radiused portions whereby further translational movement within trough 42 is prevented, and the plugs 18" are discharged downwardly from port 58. In addition, it is also noted that in the unlikely, but remotely possible, instance that one of the plugs 18 does not attain a stable condition or state as shown at 18" in FIG. 2 when the plug 18 is in fact within the vicinity of discharge port 58 as shown by plug 18", but to the contrary, for example, is disposed in a transverse mode upon a sidewall portion thereof as shown at 18' in FIG. 2, the trough 42 is, in effect, continued beyond the location of discharge port 58 so as to define an extended portion 64 which is defined between the sidewall portions 60. In this manner, the small diameter portion 22 of each plug 18 will be able to be disposed within trough portion 64 while the shoulder portion 24 encounters the restricted wall portions 62 thereby arresting further movement of the plug 18 within the orientation device. Under the vibrational forces impressed upon the plug 18, the same will pivot such that the small diameter portion 22 will be disposed downwardly and the plug 18 will be discharged from the port 58 in its proper vertical orientation mode.

Obviously, many modifications and variations of the present invention are possible in light of the above teachings. For example, in order to continuously provide properly oriented plugs 18" to the discharge port 58 and the shuttle mechanism operationally interfacing therewith, the plugs 18 may be initially delivered to the funnel 12 in a timed, periodic manner from the vibratory feed bowl apparatus by suitable escape mechanisms. In addition, it is noted that the rails 44 may be either square-shaped or curvilinearly radiused, as viewed in cross-section, as may be desired in order to obtain a particular degree of stability for the plugs 18 as they travel from trough 36 to discharge port 58. It is therefore to be understood that within the scope of the appended claims, the present invention may be practiced otherwise than as specifically described herein.

We claim:

1. Apparatus for orienting articles, wherein the articles have a substantially right circular cylindrical configuration as defined about a longitudinal axis and characterized by a first diameter portion having a diametrical extent D, a second diameter portion having a smaller diametrical extent than said first diameter portion, and a length dimension L, comprising:

funnel means, having a longitudinal axis, for receiving said articles in a random manner wherein said longitudinal axis of each of said articles may be disposed in any one of an infinite number of orientations relative to said longitudinal axis of said funnel means;

passage means, having a longitudinal axis, connected to said funnel means for permitting passage of said articles through said passage means only when the longitudinal axis of each of said articles is disposed in a predetermined orientation relative to said funnel means and said passage means wherein said longitudinal axis of each of said articles will be diposed substantially co-axially with said longitudinal axis of said passage means while said first diameter portion of each of said articles will be disposed only in either a first mode in which said first diameter portions of some of said articles will be disposed vertically above their corresponding second diameter portions of said some of said articles or a second mode in which said first diameter portions of the remaining ones of said articles will be disposed vertically below their corresponding second diameter portions of said remaining ones of said articles, and for preventing passage of said articles through said passage means when said longitudinal axis of each of said articles is disposed in an orientation different from said predetermined orientation;

means for re-orienting each of said articles passing through said passage means through an angle of 90° such that each of said articles has its longitudinal axis disposed horizontally; and conveyor means for re-orienting each of said horizontally disposed articles through an angle of 90° such that said first large diameter portions of all of said articles are disposed vertically above said second smaller diameter portions of said articles for discharge in a final orientation mode.

2. Apparatus as set forth in claim 1, wherein:

one of said diametrical extent and length dimensions D and L of each one of said articles is greater than the other one of said diametrical extent and length dimensions D and L of each one of said articles; and said passage means has a diametrical extent d which is greater than the greater one of said diametrical extent and length dimensions D and L of each one of said articles yet which is less than the lineal dimension DG as taken along a diagonal of any one of said articles which extends between any point upon one peripheral edge surface of said any one of said articles to a diametrically opposed point upon the other peripheral edge surface of said any one of said articles wherein the peripheral edge surfaces of said any one of said articles are separated by a distance substantially corresponding to said length dimension L of each one of said articles so as to permit said passage of each one of said articles through said passage means only when the longitudinal axis of each one of said articles is disposed within one of said two modes relative to said passage means, and for preventing said passage of each one of said articles through said passage means when said longitudinal axis of each one of said articles is disposed in a mode different from either one of said two modes.

3. Apparatus as set forth in claim 2, wherein:

the diametrical extent D of each of said articles is greater than the length dimension L of each of said articles.

4. Apparatus as set forth in claim 2, further comprising:

bracket means for mounting said apparatus upon a vibratory feed bowl conveyor which supplies said articles to said orientation apparatus.

5. Apparatus as set forth in claim 4, wherein:

each of said articles is provided with chamfered surfaces along the peripheral edge portions at each end of said article for facilitating movement into said either one of said predetermined orientation from said different orientation under the influence of vibrational forces transmitted to said orientation apparatus from said vibratory feed bowl conveyor.

6. Apparatus as set forth in claim 2, wherein:

said articles are nuclear reactor fuel rod end plugs.

7. Apparatus as set forth in claim 2, wherein:

an annular peripherally flanged shoulder portion is defined between said first and second diameter portions of each of said articles.

8. Apparatus as set forth in claim 7, further comprising:

a discharge port disposed downstream of said conveyor means through which said articles are discharged in said final orientation mode in which said first diameter portion of each one of said articles is disposed elevationally above said second smaller diameter portion of each one of said articles.

9. Apparatus as set forth in claim 8, wherein:

said re-orienting means comprises a deflector plate disposed beneath said passage means for intercepting said articles as they pass through said passage means and deflecting said articles toward said discharge port.

10. Apparatus as set forth in claim 8, wherein:

said conveyor means comprises a set of rails upon which said articles can be ridingly supported by means of said shoulder portion.

11. Apparatus as set forth in claim 10, wherein:

said conveyor means comprises a stepped-down recessed portion defined beneath said set of rails for accommodating said smaller diameter portion of each article when said article is suspendingly supported upon said rails by said shoulder portion.

12. Apparatus as set forth in claim 9, wherein:

said conveyor means comprises a semi-circular trough disposed immediately downstream of said deflector plate and having a diameter substantially the same as that of said first diameter portion of said article for facilitating movement of said articles through said trough after said articles have been deflected by said deflector plate.

13. Apparatus as set forth in claim 12, wherein:

said trough is disposed perpendicularly to said passage means; and said deflector plate has a right triangular configuration wherein the hypotenuse is disposed beneath said passage means for deflecting said articles from the locus of travel through said passage means through 90° to the locus of travel through said trough.

14. Apparatus as set forth in claim 8, further comprising:

means disposed within the vicinity of said discharge port for preventing overtravel of said articles past said discharge port.

15. Apparatus as set forth in claim 14, wherein:

said overtravel preventing means comprises restricted radiused wall portions partially defining said discharge port.

* * * * *